United States Patent
Taylor et al.

(10) Patent No.: US 7,152,716 B2
(45) Date of Patent: Dec. 26, 2006

(54) CONTROL SYSTEM AND METHOD FOR A DISC BRAKE

(75) Inventors: Martin P. Taylor, Torfaen (GB); Mark A. Norman, South Wales (GB)

(73) Assignee: Meritor Heavy Vehicle Braking Systems (UK) Ltd., Gwent (GB)

( * ) Notice: Subject to any disclaimer, the term of this patent is extended or adjusted under 35 U.S.C. 154(b) by 0 days.

(21) Appl. No.: 10/967,912

(22) Filed: Oct. 18, 2004

(65) Prior Publication Data

US 2005/0082122 A1    Apr. 21, 2005

(30) Foreign Application Priority Data

Oct. 16, 2003   (GB)   ................ 0324243.5

(51) Int. Cl.
*F16D 65/66*   (2006.01)
*F16D 65/38*   (2006.01)
*F16D 66/02*   (2006.01)

(52) U.S. Cl. ................. 188/71.8; 188/1.11 L

(58) Field of Classification Search ......... 188/1.11 W, 188/1.11 L, 1.11 E, 71.7, 71.8, 71.9; 303/20

See application file for complete search history.

(56) References Cited

U.S. PATENT DOCUMENTS

| | | | |
|---|---|---|---|
| 4,804,073 A | 2/1989 | Taig et al. | |
| 4,995,483 A | 2/1991 | Moseley et al. | |
| 6,003,640 A | 12/1999 | Ralea | |
| 6,012,556 A * | 1/2000 | Blosch et al. | ............. 188/71.8 |
| 6,237,729 B1 | 5/2001 | Blattert | |
| 6,279,694 B1 | 8/2001 | Bohm et al. | |
| 6,293,370 B1 * | 9/2001 | McCann et al. | ........... 188/71.8 |
| 6,464,308 B1 * | 10/2002 | Kubota | ....................... 303/20 |
| 6,481,542 B1 * | 11/2002 | Giering et al. | ............. 188/71.7 |
| 6,536,562 B1 * | 3/2003 | Bohm et al. | ............... 188/71.7 |
| 2005/0040703 A1 * | 2/2005 | Baumgartner | ............... 303/155 |

FOREIGN PATENT DOCUMENTS

| | | |
|---|---|---|
| DE | 103 05 702 | 10/2003 |
| EP | 0 995 923 | 5/2002 |
| WO | WO 02/088562 | 11/2002 |
| WO | WO 03/033931 | 4/2003 |
| WO | WO 03/082651 | 10/2003 |

OTHER PUBLICATIONS

United Kingdom Search Report dated Mar. 15, 2004.
European Search Report dated Jan. 19, 2005.

* cited by examiner

*Primary Examiner*—Thomas Williams
(74) *Attorney, Agent, or Firm*—Carlson, Gaskey & Olds

(57) ABSTRACT

A control system for a disc brake adjuster mechanism includes a controller and an electric adjuster motor for operable connection to an adjuster mechanism for driving a friction lining towards and away from a disc brake rotor to maintain a predetermined running clearance between the brake rotor and the friction lining when a brake is not applied. The system further includes a brake displacement sensor, and the controller is programmed to determine the brake displacement at which a predetermined load on the friction lining is achieved due to the contact with the disc brake rotor. The predetermined load is determined from a parameter of the electric adjuster motor or adjuster mechanism. The system is programmed to measure the brake displacement during brake release.

12 Claims, 6 Drawing Sheets

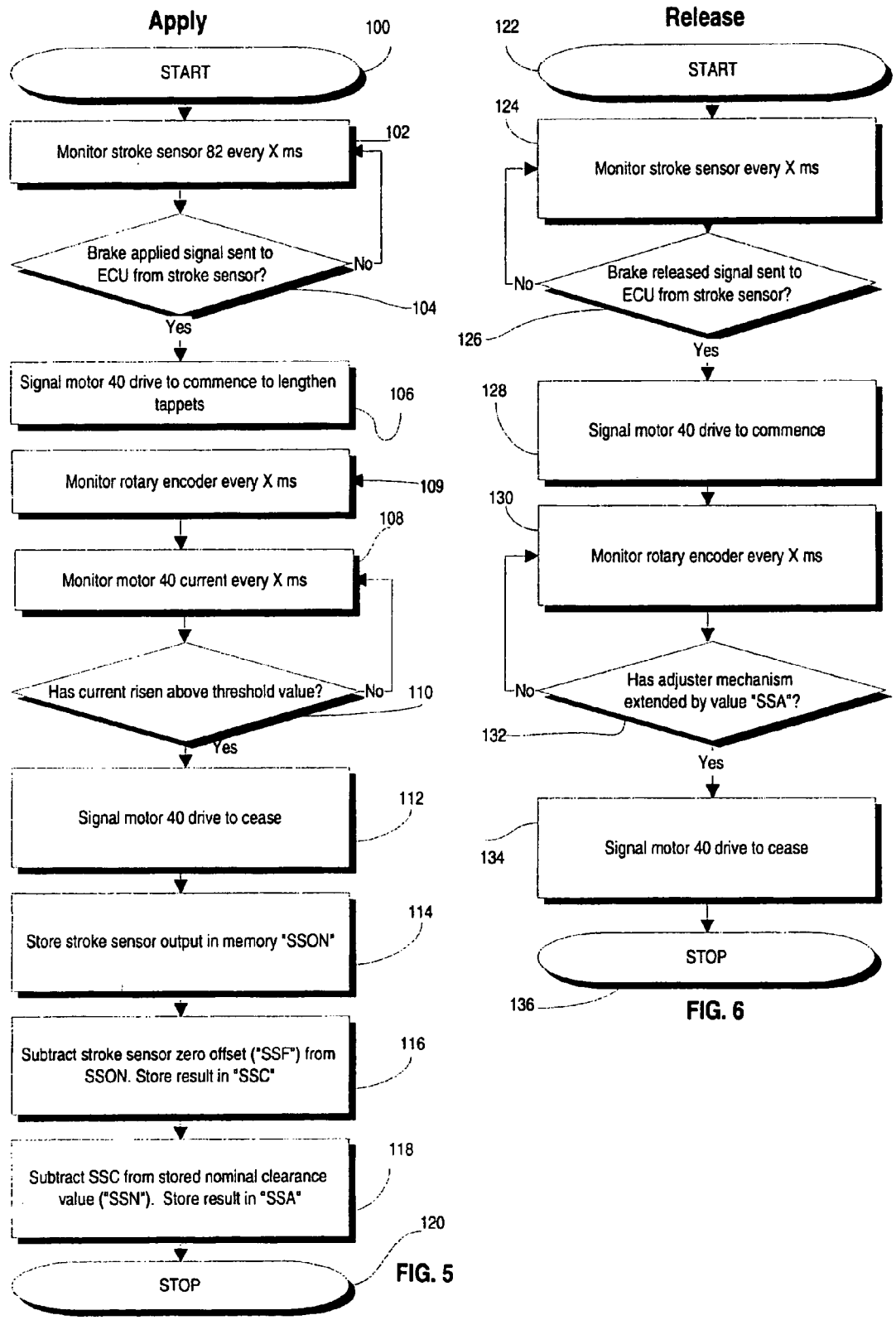

CONTROL SYSTEM AND METHOD FOR A DISC BRAKE

REFERENCE TO RELATED APPLICATION

This application claims priority to United Kingdom Patent Application 0324243.5 filed on Oct. 16, 2003.

BACKGROUND OF THE INVENTION

The present invention relates to a control system and a control method for a disc brake, in particular an adjuster mechanism of a disc brake.

It is known to provide an electric motor to control the running clearance of friction linings relative to a brake rotor based upon signals from sensors that monitor the clearance take-up movement and the brake actuation stroke. The known systems tend to mimic the mechanical operation of a conventional brake clearance control device, known as an "automatic adjuster." In such adjusters, a clutch having some degree of lost motion is provided where the level of free motion is equivalent to the maximum allowable running clearance. If the friction linings wear such that the running clearance is greater than the maximum allowable running clearance, the free running clearance is "taken-up" upon operation of the brake, and the further additional free movement, caused by the excess lining clearance, causes the clutch to rotate. The rotation moves the backstop or datum position for the return of the friction lining, thus progressively advancing the friction lining towards the brake rotor as the friction lining wears. When the friction lining contacts the brake rotor, the increased load in the system causes the clutch to slip, preventing further unwanted adjustment and/or overloading of the automatic adjuster. Such mechanical automatic adjusters are well known in the art.

In the brake of the present invention, it is important to reduce weight, the power consumption (whether electrical or pneumatic) and material costs. Unfortunately, in a conventional brake having an automatic adjuster of the mechanical kind or even an electric adjuster that mimics the mechanical operation, the strength of the mechanisms of the adjuster have to be extremely high. This is because the actual brake adjustment occurs only while the brake is being applied rather than during brake release. It is common in "sliding caliper" brakes for the load to be applied directly on only one side of the brake rotor. The caliper frame slides to apply a load to the other side of the brake rotor. The load is present before both friction linings fully contact the brake rotor. Therefore, the adjuster drive train has to be capable of driving through the load.

European Patent Application 0995923 (Meritor Automotive, Inc.) teaches a pressure sensor disposed at an input end of an operating shaft ("op-shaft") of a disc brake to determine when operation of the brake occurs and the running clearance is taken-up. The position of the op-shaft when the running clearance has been taken up is measured such that, upon brake release, the electric motor driven adjuster mechanism may move the datum position for the return of the friction lining to maintain a constant running clearance as the friction lining wears.

The present invention seeks to overcome, or at least mitigate, the problems of the prior art.

SUMMARY OF THE INVENTION

The present invention provides a control system for a disc brake adjuster mechanism. The system includes a controller and an electric adjuster motor for operable connection to the adjuster mechanism for driving a friction lining towards and away from a disc brake rotor to maintain a predetermined running clearance between the disc brake rotor and the friction lining when a brake is not applied. The system further includes a brake displacement sensor. The controller is programmed to determine the brake displacement at which a predetermined load on the friction lining is achieved due to the contact with the disc brake rotor. The predetermined load is determined from a parameter of the electric adjuster motor or the adjuster mechanism, and the system is programmed to measure the brake displacement during brake release.

The present invention also provides a method of determining the displacement of a brake at which a predetermined load on a friction lining is achieved. The brake includes a brake actuator, a friction lining, a brake rotor, a brake displacement sensor, a controller and an adjuster mechanism including an electric adjuster motor. The method includes the steps of producing a signal to drive the electric adjuster motor while there is a force acting between the brake rotor and the friction lining during release of the brake and monitoring a parameter of the electric adjuster motor or the adjuster mechanism to determine whether a predetermined load on the friction lining is achieved. The method also includes the step of determining the brake displacement at which the load is achieved.

The present invention also provides a control system for a disc brake adjuster mechanism. The system includes a controller and an electric adjuster motor for operable connection to the disc brake adjuster mechanism for driving a friction lining towards and away from a disc brake rotor to maintain a predetermined running clearance between the brake rotor and the friction lining when a brake is not applied. The system further includes a brake displacement measurer. The controller is programmed to determine the brake displacement at which a predetermined load on the friction lining is achieved due to the contact with the brake rotor. The predetermined load is determined from a parameter of the electric adjuster motor or the adjuster mechanism. The system further includes a separate actuator operable to apply the brake to retard rotation of the brake rotor.

These and other features of the present invention will be best understood from the following specification and drawings.

BRIEF DESCRIPTION OF THE DRAWINGS

The invention is described further hereinafter, by way of example only, with reference to the accompanying drawings, in which:

FIGS. 5 and 6 are flowcharts showing an adjustment method according to one embodiment of the present invention; and FIG. 6 is a flowchart showing an adjustment method according to another embodiment of the present invention.

DETAILED DESCRIPTION OF THE PREFERRED EMBODIMENT

Figure 1:
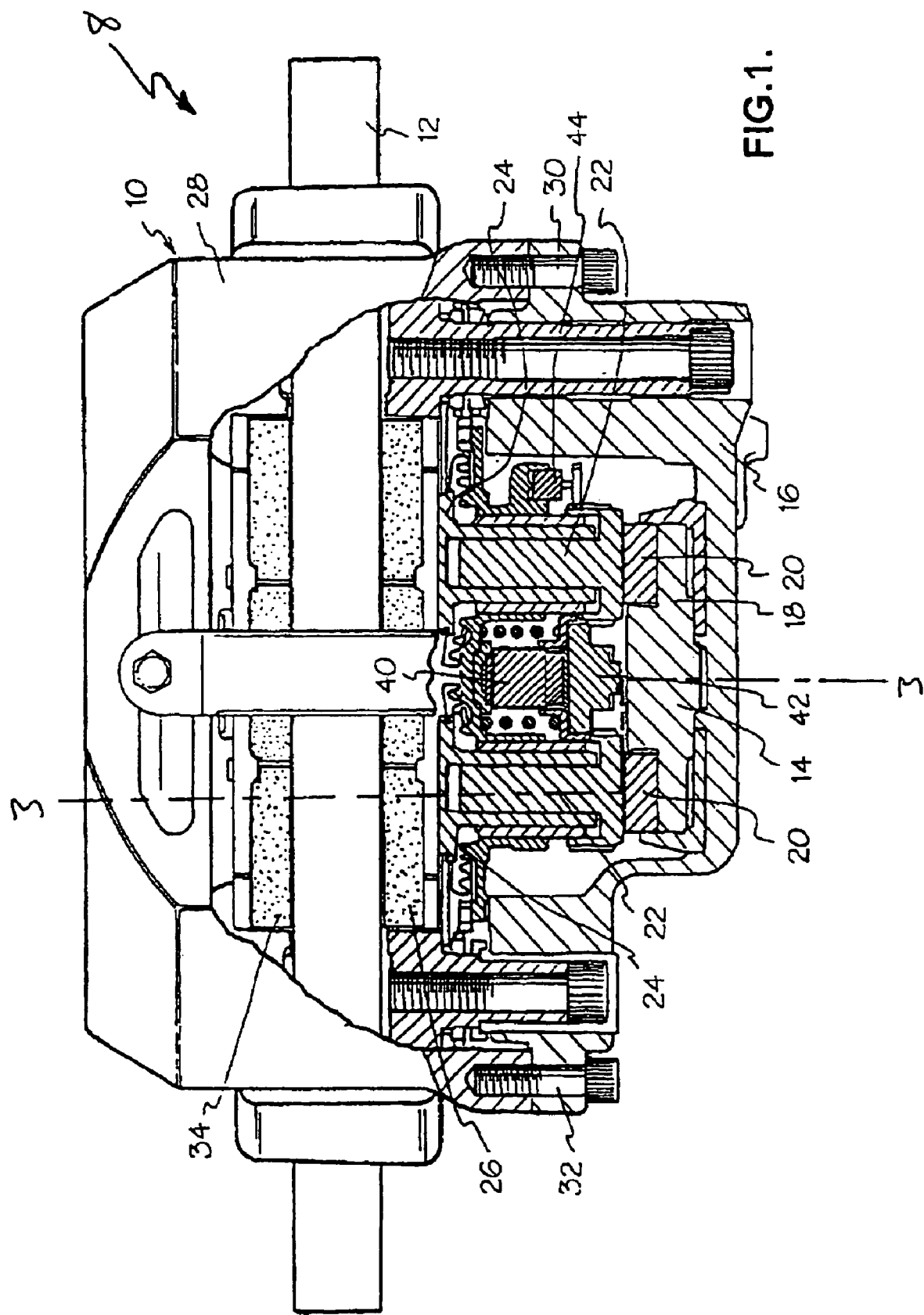
FIG. 1 is a partially sectioned plan view of one embodiment of a brake in accordance with the present invention.
Figure 3:
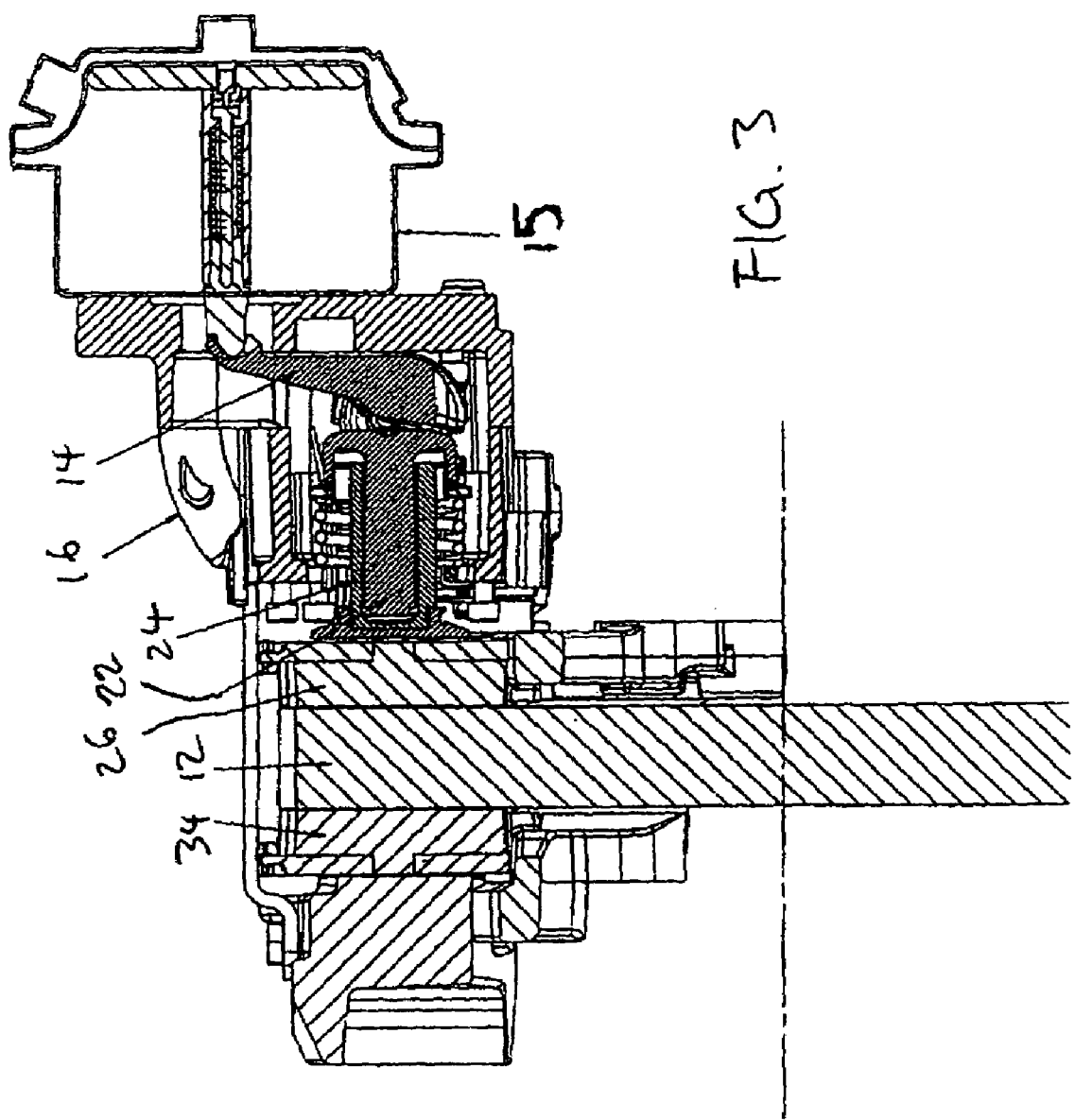
FIG. 3 is a cross-sectional view along the line 3—3 of FIG. 1.

FIG. 1 illustrates a brake 8 including a caliper housing 10 that straddles a disc or rotor 12 mounted on an axle of the vehicle to be braked (not shown). The brake 8 is actuated by mechanical movement of an input actuator 15, such as an air cylinder (shown in FIG. 3). Such actuators are well known in the field of brake actuation. The input actuator 15 cooperates with an outer end of the operating shaft or 'op-shaft' 14 of the brake 8. An inner end of the op-shaft 14 is carried in a bearing attached to a lower end of an inner housing part 16. The inner end of the op-shaft 14 has a pocket positioned eccentrically to the axis of rotation of the op-shaft 14 which, upon rotation, causes a reaction force to be transmitted to rollers 20. The rollers 20 in turn transmit the applied load to a pair of spaced inner tappet members 22. The inner tappet members 22 are threadedly engaged with associated outer tappet members 24, which apply the input load from the input actuator 15 to the rear of an inner friction lining 26, thus pressing the friction material of the inner friction lining 26 into frictional engagement with the disc or rotor 12.

A reaction force is generated through the frictional engagement between the disc or rotor 12 and the inner friction lining 26 that is fed back through the inner tappet members 22, the outer tappet members 24, the rollers 20 and the op-shaft 14 supported by the inner housing part 16. The inner housing part 16 is secured to an outer housing part 28 by bridging bolts 30 and 32. Thus, the applied force that is generated by movement of the op-shaft 14 is ultimately transmitted by a reaction means to the outer housing part 28, which in turn presses the outer friction lining 34 into frictional engagement with the disc or rotor 12. Therefore, upon movement of the op-shaft 14, the disc or rotor 12 is clamped between the inner friction lining 26 and the outer friction lining 34 to generate a braking force to brake the vehicle under control of the applied input movement.

As shown in FIG. 1, the brake 8 also includes an electric motor 40 that is adapted to drive via a reduction gearbox 42 a part of the telescopic tappet assembly, shown here by way of example as a multi-stage planetary gearbox. Upon rotation, the telescopic tappet assembly increases or reduces the overall length of the tappet assembly (which includes the inner tappet members 22 and the outer tappet members 24) in accordance with the direction of rotation of the electric motor 40. The extension or contraction of the tappet assembly adjusts the rest position of the brake applying member, and therefore the clearance available between the friction linings 26 and 34 and the disc or rotor 12. The electric motor 40, the reduction gearbox 42, the inner tappet members 22 and the outer tappet members 24 together constitute an adjuster mechanism of the brake 8.

A rotary encoder 44, that is driven from a part of the tappet assembly that moves upon adjustment, produces a signal which is arranged to be processed in an Electronic Control Unit (ECU) 80. The output from the rotary encoder 44 is accumulated to measure the total position, and therefore total movement, of the adjustment mechanism. The output is proportional to the actual wear condition of the friction linings 26 and 34.

Figure 2:
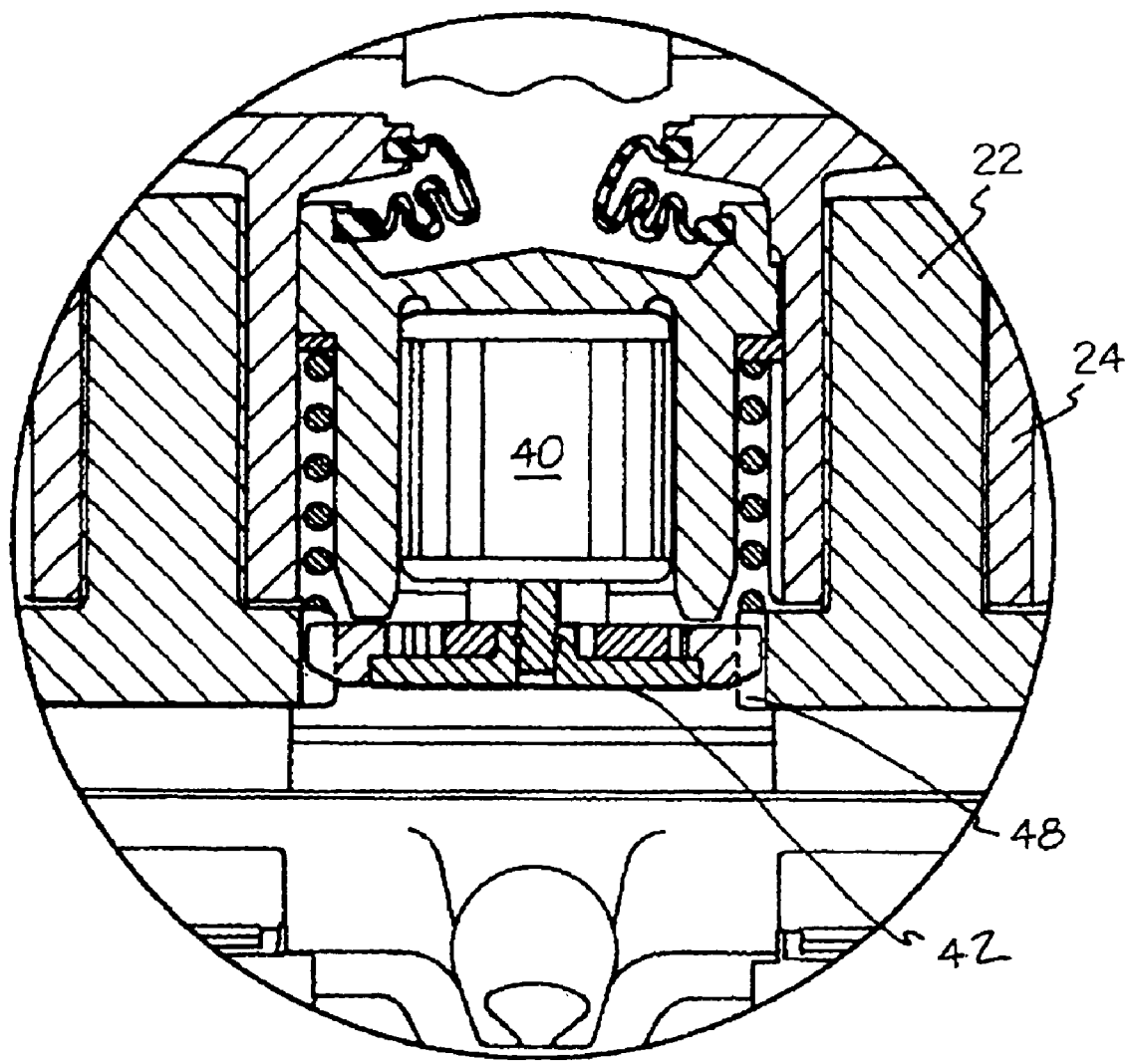
FIG. 2 is an enlarged detail of FIG. 1 showing a motor and gearbox installation.

Once it is determined that the brakes 8 have been released, the obtained clearance data is used by the ECU 80 determines whether an adjustment of the clearance is required. If an adjustment is required, then the electric motor 40 is driven to the new position. As shown in FIG. 2, the electric motor 40 output drives through the cycloid reduction gearbox 42 and onto a gear form 48 associated with the inner tappet members 22. The inner tappet members 22 are threadedly engaged with the outer tappet members 24, which are fixed against rotation. Rotation of the inner tappet members 22 cause the overall tappet assembly to either extend or contract. The torque required to drive the tappet assembly to produce the above-mentioned effect is substantially lower when the tappet assembly is not under any substantial axial loading because the friction level is drastically reduced between the inner tappet members 22 and the outer tappet members 24. The torque required to produce the adjustment movement is substantially small with respect to the torque required had the brakes been applied, and therefore the reduction gearbox 42 and the tappet assembly drives can now be produced from a material that is substantially lighter.

Figure 4:
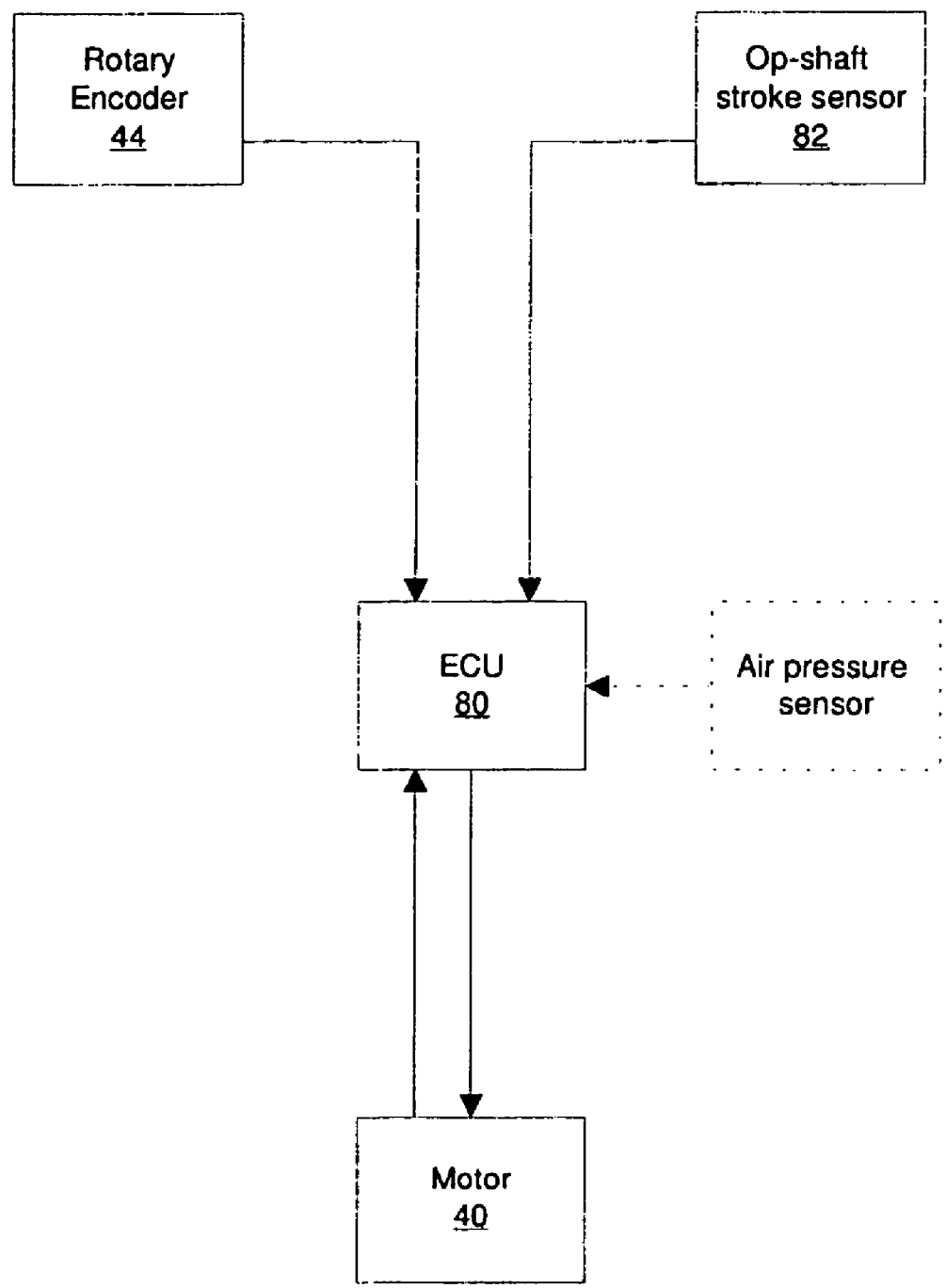
FIG. 4 is a schematic diagram illustrating the electronic components of the control system.

FIG. 4 schematically illustrates the electrical components of the control system. The ECU 80 receives signals from the rotary encoder 44 and an op-shaft stroke sensor 82 and (in the method of the second embodiment) an air pressure sensor 84 (shown in broken lines). The ECU 80 may signal the driving of the electric motor 40 and may receive signals from the electric motor 40 or elsewhere on a motor drive circuit regarding the amount of current passing therethrough. The op-shaft stroke sensor 82 may be any suitable type of contacting sensor or non-contacting sensor.

FIGS. 5 and 6 show one embodiment of the method of operation of the control system in flowcharts. The method operates as follows:

The operation starts at step 100, and the system begins by monitoring the output of the op-shaft stroke sensor 82 at predetermined intervals at step 102. At step 104, the ECU 80 determines whether the signal from the op-shaft stroke sensor 82 has reached a threshold value that indicates that the brake 8 has been applied. If the brake 8 has been applied, the ECU 80 signals the electric motor 40 to lengthen the brake tappet assembly at step 106. The ECU 80 then begins to monitor the current flowing through the electric motor 40 at predetermined intervals and at step 110 senses when the current increases above a predetermined threshold value (which is indicative of the electric motor 40 stalling). Once this occurs, the ECU 80 then signals for the electric motor 40 drive to cease so that the electric motor 40 is no longer seeking to extend the tappet assembly. At step 114, the ECU 80 stores the stroke sensor output in a memory "SSON" and at step 116 subtracts the stroke sensor zero offset value "SSF" (i.e., a stroke sensor reading when the op-shaft 14 is in a released rest position) from SSON. This value is then stored in memory "SSC". At step 118, the value SSC is then subtracted from a stored nominal clearance value "SSN" (i.e., the desired clearance value of the disc or rotor 12 to the friction lining (with the brake released) to equate to the amount of adjustment required to restore the clearance to the desired nominal clearance. This value is stored in memory "SSA" before the sequence of steps stops at 120.

Referring now to FIG. 6, the sequence of steps starts at 122 with the brake 8 being applied. Again, the ECU 80 monitors the shaft stroke sensor 82 at predetermined intervals at step 124 and determines whether the brake 8 has been released in response to the shaft stroke sensor 82 providing a predetermined signal. Once this has occurred, the ECU 80 signals the electric motor 40 drive to commence at step 128 to lengthen the tappet assembly. The ECU 80 also monitors the extension of the tappet assembly via the rotary encoder 44 until the tappet assembly has been extended by a value equivalent to SSA. The ECU 80 then signals the electric motor 40 drive to cease and the adjustment cycle stops at step 136.

Figure 7:
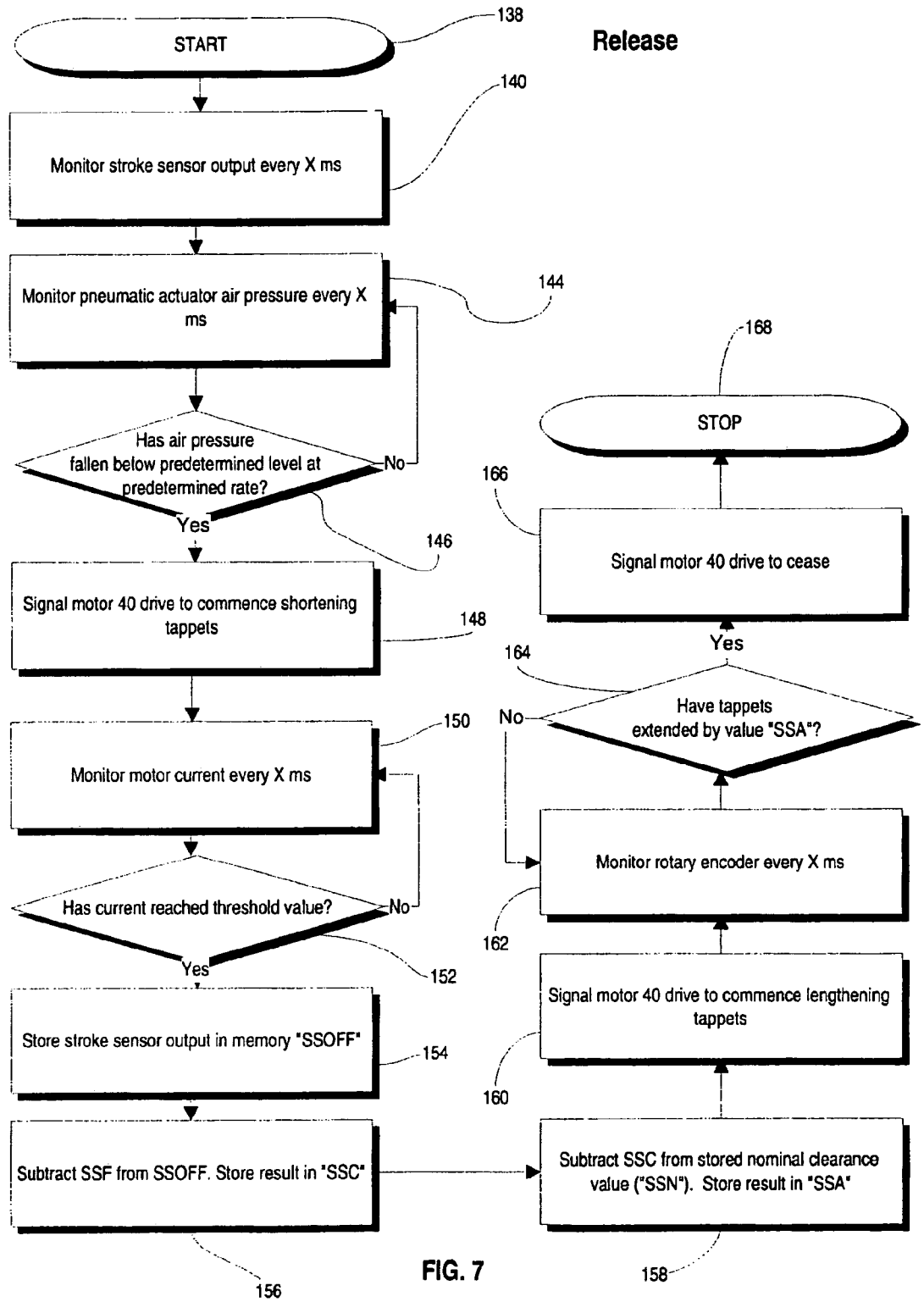

FIG. 7 illustrates a control system and adjustment method according to a second embodiment of the present invention in which both the measurement of the required amount of adjustment and the lengthening of the tappet assembly occurs during the release of the brake 8.

The sequence starts at step 138 and begins by monitoring the stroke sensor output at predetermined intervals at step 140. To determine when the brake 8 is released, the ECU 80 monitors the air pressure in the input actuator 15 or pneumatic actuator using the air pressure sensor 84 at step 144 and at step 146 determines that the brake 8 is being released once the air pressure has fallen below a predetermined level at a predetermined rate. At step 148, the ECU 80 signals the electric motor 40 to shorten the tappet assembly. However, at this point, the electric motor 40 torque is insufficient to overcome the friction induced by the force passing through the tappet assembly to the friction lining, causing the electric motor 40 to stall. The ECU 80 monitors the motor current at predetermined intervals at step 150 so it can determine when the current through the electric motor 40 has dropped to a predetermined threshold value that indicates that the torque of the electric motor 40 is sufficient to drive the tappet assembly. At the point that the electric motor 40 drive starts, the ECU 80 stores the stroke sensor output in memory SSOFF at step 154 before subtracting SSF (i.e., a stroke sensor reading when the op-shaft 14 is in a released rest position) from SSOFF at step 156 to give a value SSC which is stored in the memory.

To give the total amount by which the tappet assembly should be adjusted, SSC is subtracted from a stored nominal clearance value SSN (e.g., 0.25 mm). The result is stored in memory SSA and equates to the amount by which the inner tappet members 22 and the outer tappet members 24 must be extended to return the brake 8 to the correct running clearance. To do this, the ECU 80 signals the electric motor 40 to drive to lengthen the tappet assembly and monitors the position of the rotary encoder 44 at predetermined intervals until the ECU 80 determines that the tappet assembly has extended by amount SSA. Once the inside tappet members 22 and the outer tappet members 24 have extended by this amount, the ECU 80 signals the electric motor 40 to cease driving, and the adjustment procedure stops at step 168.

One advantage of this adjustment method is that the stroke sensor outputs SSON and SSOFF are measured at the end of the brake 8 application cycle when the brake disc or rotor 12 and the friction linings 26 and 34 may be heated and have therefore expanded. Thus, the danger of "over adjustment" on the basis of values measured when the disc or rotor 12 and the friction linings 26 and 34 are cold does not arise, and the brake 8 clearance is correctly set for the brakes when hot.

It should be appreciated that as an alternative to measuring the electric motor 40 current, the point at which the tappet assembly comes out of contact with the inner friction linings may be determined directly or indirectly from rotation of the electric motor 40, the gears 46, or the inner tappet members 22.

The ECU 80 may be programmed to only carry out the adjustment intermittently (e.g., every tenth brake application). Rather than seeking to correct the clearance fully each time it is determined that adjustment is needed, the ECU 80 may be programmed to signal the electric motor 40 to drive a fixed increment for each brake application so the correct adjustment is only achieved after more than one brake application.

The output from the tappet driven wear-out sensor or rotary encoder 44 may be recorded or accumulated to provide a signal indicative of the worn condition of the friction linings.

Should the signal from the wear-out sensor or rotary encoder 44 determine that a friction lining change is required, an alarm or other indication can then be issued. Re-adjustment of the brake 8 or retraction of the brake applying members is then instigated through use of an electrical or electronic switch (not shown). Once activated, the system determines whether the vehicle is in a correct condition to allow the brake to be 'opened', i.e., stationary. If this condition is satisfied, then the electric motor 40 is energized to cause the brake-applying members to retract from the disc or rotor 12. As the brake 8 is no longer in correct adjustment, a flag is set to indicate to the ECU 80 that an adjustment is required.

After re-assembly of the brake 8, the out-of-adjustment flag is recognized, and the brake 8 is re-adjusted.

It should also be appreciated that the same principles may be applied to other forms of the brake 8 that are not of the sliding caliper type. The invention may also be applied to electromechanical brakes in which an electric motor replaces the air actuator. In brakes of this type, the electric motor may carry out adjustments to maintain the correct running clearance, as well as supply a braking force.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A control system for a disc brake adjuster mechanism, the control system comprising:
   an electric adjuster motor for operable connection to the disc brake adjuster mechanism and for driving a friction lining towards and away from a disc brake rotor to maintain a predetermined running clearance between the disc brake rotor and the friction lining when a brake is not applied;
   a brake displacement sensor; and
   a controller programmed to determine a brake displacement at which a predetermined load on the friction lining is achieved due to contact with the disc brake rotor, wherein the predetermined load is determined from a current parameter of the electric adjuster motor, and
   wherein the control system is programmed to signal operation of the electric adjuster motor and to measure the current parameter of the electric adjuster motor while the brake is being released in order to determine the predetermined load, and the control system is further programmed to measure the brake displacement at the predetermined load while the brake is being released.

2. The control system according to claim 1 further including an operating shaft and a stroke sensor that measures displacement of the operating shaft.

3. The control system according to claim 1 further comprising a release sensor to detect when the brake begins to release.

4. The control system according to claim 1 wherein the control system is programmed to signal the electric adjuster motor to drive once the brake is released to adjust a running clearance between the disc brake rotor and the friction lining.

5. The control system according to claim 4 further including an adjuster mechanism sensor to monitor an amount of adjustment applied by the electric adjuster motor.

6. The control system according claim 1 wherein the control system adjusts a running clearance between the disc brake rotor and the friction lining based on a predetermined proportion of brake applications, and the predetermined proportion is less than one.

7. The control system according to claim 1 wherein the controller is programmed to detect a decrease in motor current while the brake is being released to determine the predetermined load.

8. A brake comprising:
   a control system for a disc brake adjuster mechanism having an electric adjuster motor for operable connection to the disc brake adjuster mechanism for driving a friction lining towards and away from a disc brake rotor to maintain a predetermined running clearance between the disc brake rotor and the friction lining when the brake is not applied;
   a brake displacement sensor; and
   a controller programmed to determine a brake displacement at which a predetermined load on the friction lining is achieved due to contact with the disc brake rotor, wherein the predetermined load is determined from a current parameter of the electric adjuster motor, and
   wherein the control system is programmed to signal operation of the electric adjuster motor and to measure the current parameter or the electric adjuster motor while the brake is being leased in order to determine the predetermined load, and the system is further programmed to measure the brake displacement at the predetermined load while the brake is being released.

9. A method of determining a brake displacement of a brake at which a predetermined load on a friction lining is achieved, the brake including a brake actuator, the friction lining, a disc brake rotor, a brake displacement sensor, a controller and an adjuster mechanism having an electric adjuster motor, the method comprising the steps of:
   producing a signal to drive the electric adjuster motor while a force acts between the disc brake rotor and the friction lining during release of the brake;
   monitoring current of the electric adjuster motor while the brake is being released in order to determine whether the predetermined load on the friction lining is achieved; and
   determining the brake displacement at which the predetermined load is achieved.

10. The method according to claim 9 further comprising a step of comparing the brake displacement at the predetermined load with another brake displacement at one of a rest state and a no-load state to determine an amount of brake adjustment required to achieve a predetermined running clearance between the disc brake rotor and the friction lining.

11. The method according to claim 10 further comprising a step of signalling the electric adjuster motor to adjust the adjuster mechanism to restore the predetermined running clearance once the brake is fully released.

12. A control system for a disc brake adjuster mechanism, the control system comprising:
   an electric adjuster motor for operable connection to an adjuster mechanism for driving a friction lining towards and away from a disc brake rotor to maintain a predetermined running clearance between the disc brake rotor and the friction lining when a brake is not applied;
   a brake displacement sensor;
   a controller programmed to determine a brake displacement at which a predetermined load on the friction lining is achieved due to contact with the disc brake rotor, wherein the predetermined load is determined from one of a parameter of the electric adjuster motor and a rotation parameter of the disc brake adjuster mechanism; and
   a separate actuator operable to apply the brake to retard rotation of the disc brake rotor, wherein the separate actuator is an air cylinder.

* * * * *

UNITED STATES PATENT AND TRADEMARK OFFICE
CERTIFICATE OF CORRECTION

PATENT NO.       : 7,152,716 B2                                    Page 1 of 1
APPLICATION NO.  : 10/967912
DATED            : December 26, 2006
INVENTOR(S)      : Taylor et al.

It is certified that error appears in the above-identified patent and that said Letters Patent is hereby corrected as shown below:

Claim 8, Column 7, line 38: "or" should be --of--

Claim 8. Column 7, line 39: "leased" should be --released--

Signed and Sealed this

Sixth Day of March, 2007

JON W. DUDAS
*Director of the United States Patent and Trademark Office*